(12) United States Patent
Fischer et al.

(10) Patent No.: US 7,780,433 B2
(45) Date of Patent: Aug. 24, 2010

(54) HOT RUNNER NOZZLE HAVING THERMAL INSERT AT DOWNSTREAM END

(75) Inventors: Jonathon Fischer, Oakville (CA); Rhonda Goslinski, Guelph (CA); Ryan Smith, Guelph (CA)

(73) Assignee: Mold-Masters (2007) Limited, Georgetown (CA)

( * ) Notice: Subject to any disclaimer, the term of this patent is extended or adjusted under 35 U.S.C. 154(b) by 201 days.

(21) Appl. No.: 12/056,782

(22) Filed: Mar. 27, 2008

(65) Prior Publication Data

US 2008/0241298 A1    Oct. 2, 2008

Related U.S. Application Data

(60) Provisional application No. 60/908,404, filed on Mar. 27, 2007.

(51) Int. Cl.
*B29C 45/20* (2006.01)
(52) U.S. Cl. .................................. 425/549; 425/572
(58) Field of Classification Search ............. 425/549, 425/572
See application file for complete search history.

(56) References Cited

U.S. PATENT DOCUMENTS

| | | | |
|---|---|---|---|
| 5,232,710 A * | 8/1993 | Miyazawa et al. ......... 425/572 |
| 6,609,902 B1 | 8/2003 | Blais et al. | |
| 6,789,745 B1 | 9/2004 | Babin et al. | |
| 7,108,503 B2 | 9/2006 | Olaru | |
| 7,182,591 B2 | 2/2007 | Babin | |
| 7,458,803 B2 | 12/2008 | Bouti | |
| 7,467,940 B2 | 12/2008 | Bouti | |
| 2005/0045746 A1 | 3/2005 | Blais | |
| 2005/0225000 A1 | 10/2005 | Tabassi | |
| 2006/0113407 A1 | 6/2006 | Ciccone | |
| 2006/0153944 A1 | 7/2006 | Ciccone | |
| 2008/0181983 A1 | 7/2008 | Haque et al. | |
| 2008/0206391 A1 | 8/2008 | Bouti et al. | |
| 2008/0206394 A1 | 8/2008 | Bouti | |
| 2008/0206396 A1 | 8/2008 | Bouti et al. | |

FOREIGN PATENT DOCUMENTS

| EP | 0835176 B1 | 5/2000 |
|---|---|---|
| EP | 1148985 B1 | 10/2001 |
| JP | 2003-276057 A | 9/2003 |

* cited by examiner

*Primary Examiner*—Tim Heitbrink
(74) *Attorney, Agent, or Firm*—Medler Ferro PLLC

(57) ABSTRACT

In a thermally gated hot runner nozzle or hot runner system, a thermal insert is in contact with and separable from a nozzle tip and is in contact with and separable from a nozzle body. The thermal insert is made of a material having a thermal conductivity different from thermal conductivity of the material of the nozzle tip.

18 Claims, 7 Drawing Sheets

US 7,780,433 B2

HOT RUNNER NOZZLE HAVING THERMAL INSERT AT DOWNSTREAM END

CROSS-REFERENCE TO RELATED APPLICATION

This application claims the benefit of U.S. provisional patent application No. 60/908,404 filed Mar. 27, 2007, which is hereby incorporated by reference in its entirety herein.

BACKGROUND OF THE INVENTION

1. Field of the Invention

The present invention relates to injection molding. More particularly, the present invention relates to hot runner nozzles.

2. Related Art

In injection molding, hot runners are used to deliver molding material (melt) from a molding machine, which typically has an injection screw to plasticize the molding material, to a mold cavity, which is typically cooled to solidify the molding material. The purpose of the hot runner is to keep the molding material within an allowable temperature range as the molding material is injected from the molding machine to the mold cavity. Typically, the temperature of the molding material at or near the mold gate is critical. Problems can arise if the gate temperature is unsuitable for the molding material. For example, if the gate temperature is too low, the mold cavity may not completely fill; if the gate temperature is too high, the molding material may string or drool (i.e., leak) from the mold gate.

The gate temperature depends on a myriad of factors, such as properties of the molding material used, the mold cavity temperature, geometric features that the molding material navigates (e.g., gate diameter), and settings of heaters in the hot runner. Some of these factors, such as the molding material used, cannot usually be changed, while others, such as the settings of the heaters in the hot runner, can be changed easily.

In an ideal situation, an injection molding operator simply sets one or more heaters in the hot runner to obtain a gate temperature that yields molded products of satisfactory quality. If a problem such as stringing occurs, the operator can many times simply dial down a hot runner nozzle heater temperature to compensate. If a mold cavity does not fill properly, the operator may choose to increase the nozzle temperature. However, situations do arise where controlling the heater cannot obtain a gate temperature that eliminates a problem. And in many of these situations it is very difficult, if not impossible, to change another factor to achieve a satisfactory gate temperature.

SUMMARY OF THE INVENTION

In one aspect of the invention, in a thermally gated hot runner nozzle or hot runner system, a thermal insert is in contact with and separable from a nozzle tip and is in contact with and separable from a nozzle body. The thermal insert is of a material having a thermal conductivity different from the thermal conductivity of the material of the nozzle tip.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

In this disclosure, the terms "removably connect," "removably connecting," and "removably connected" should be taken to mean a connection that can easily be assembled and disassembled by a human operator. For example, threaded, screwed, bolted, clamped, and clipped connections are removably connected, whereas brazed, welded, thermally shrink-fitted connections are not. The term "separable" should be taken to mean any of a normally loose connection that needs no tools to separate and removably connected, as defined above. The examples given above should not be taken to limit the definition of any term.

Figure 1:
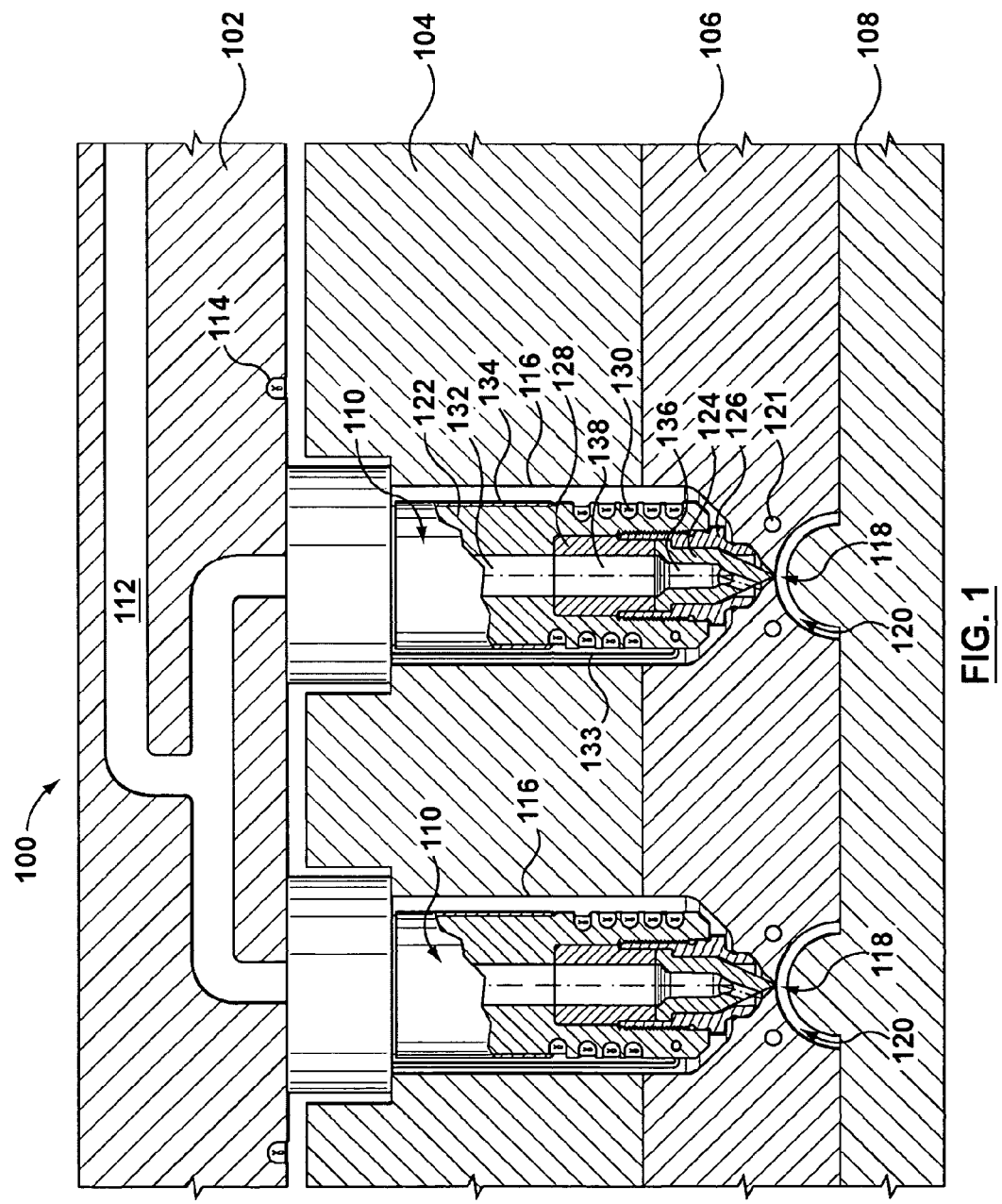
FIG. 1 is a partial section of an injection molding system according to one embodiment of the present invention.

FIG. 1 illustrates an injection molding system 100 according to one embodiment of the present invention. In the description of this embodiment, like reference numerals in the 100 and 200 series are used to describe like parts for ease of understanding. The features and aspects described for the other embodiments can be used accordingly with the present embodiment.

The injection molding system 100 includes a manifold 102; mold plates 104, 106, and 108; and nozzles 110. Other well-known components, such as a back plate, a sprue bushing, connecting bolts, alignment pins, and the like are not illustrated for clarity. Although one manifold and two nozzles are depicted, more or fewer of these components can be used.

The manifold 102 has a manifold melt channel 112 for delivering molding material (melt) from a molding machine to the nozzles 110. A manifold heater 114 is also provided in the manifold 102. The manifold heater 114 can be any known type of heater, such as an electrical resistance heater wire.

The mold plates 104 and 106 are stacked and include openings or cavities that form wells 116 in which the nozzles 110 are disposed. The wells 116 can include shoulders or other structure to support the nozzles 110. The mold plate 106 has mold gates 118 that open into mold cavities 120, which are partially defined by the mold plate 106. The mold plate 106 further has cooling fluid conduits 121 for circulating cooling fluid to cool the gate area. In another embodiment, a gate insert can be used to provide a mold gate, provide cooling fluid conduits, and/or partially define a mold cavity. In addition, depending on design considerations, more or fewer mold plates can be used.

The mold plate 108 partially defines the mold cavities 120. The mold plate 108 is shown flush with the mold plate 106, but can be retracted to eject the molded products formed in the mold cavities 120. Ejection pins and other well-known components are not shown for the sake of clarity.

The nozzles 110 are abutted to the manifold 102, though they may be threaded or connected in any other well-known manner. Each nozzle 110 includes a nozzle body 122, a nozzle tip 124, a seal piece 126, and a thermal insert 128.

The nozzle body 122 has a spirally wrapped heater 130 embedded therein. The heater 130 can be any known type of heater, such as an electrical resistance heater wire, and need not be spirally wrapped or embedded. The nozzle body 122 has a nozzle body melt channel 132, which runs through the nozzle body 122 and communicates with the manifold melt channel 112. A thermocouple 133 is provided to measure a temperature of the nozzle body 122 towards the downstream end of the nozzle 110 (nearest the mold cavity 120). In addition, the upper portion of the nozzle body 122 can, if desired, be covered by a conductive tube 134 for improving the nozzle heat profile.

The nozzle tip 124 is disposed at the downstream end of the nozzle 110.

The nozzle tip 124 includes a tip melt channel 136 that delivers molding material to the mold gate 118. In this embodiment the nozzle tip 124 is a torpedo tip, however, in other embodiments other types of tips can equally be used.

The seal piece 126 is removably connected to the downstream end of the nozzle body 122. In this embodiment, the connection is by way of a thread of the seal piece 126 mating with a thread of the nozzle body 122 (reference numerals 302, 304 in FIG. 3). Other types of connections can instead be used, provided that the seal piece 126 is removably connected to the nozzle body 122. The seal piece 126 seals to the mold plate 106, but in another embodiment the seal piece 126 can seal to a gate insert (the component to which the seal piece 126 seals is termed "mold part."). The seal piece 126 prevents molding material from flowing into the well 116. In this embodiment, the seal piece 126 holds both the nozzle tip 124 and the thermal insert 128 to the nozzle body 122.

The thermal insert 128 is disposed upstream of the nozzle tip 124. The thermal insert 128 is in contact with and separable from the nozzle tip 124, and is also in contact with and separable from the nozzle body 122. That is to say, the thermal insert 128 is loosely inserted into the front of the nozzle body 122 (though the thermal insert 128 may not be loose when the nozzle 110 is hot). The thermal insert 128 has an insert melt channel 138 that communicates with the nozzle body melt channel 132 and the tip melt channel 136, such that the nozzle body melt channel 132, the tip melt channel 136, and the insert melt channel 138 are in mutual communication allowing flow of molding material. The material used to make the thermal insert 128 is important, and will be discussed in detail later.

Figure 2:
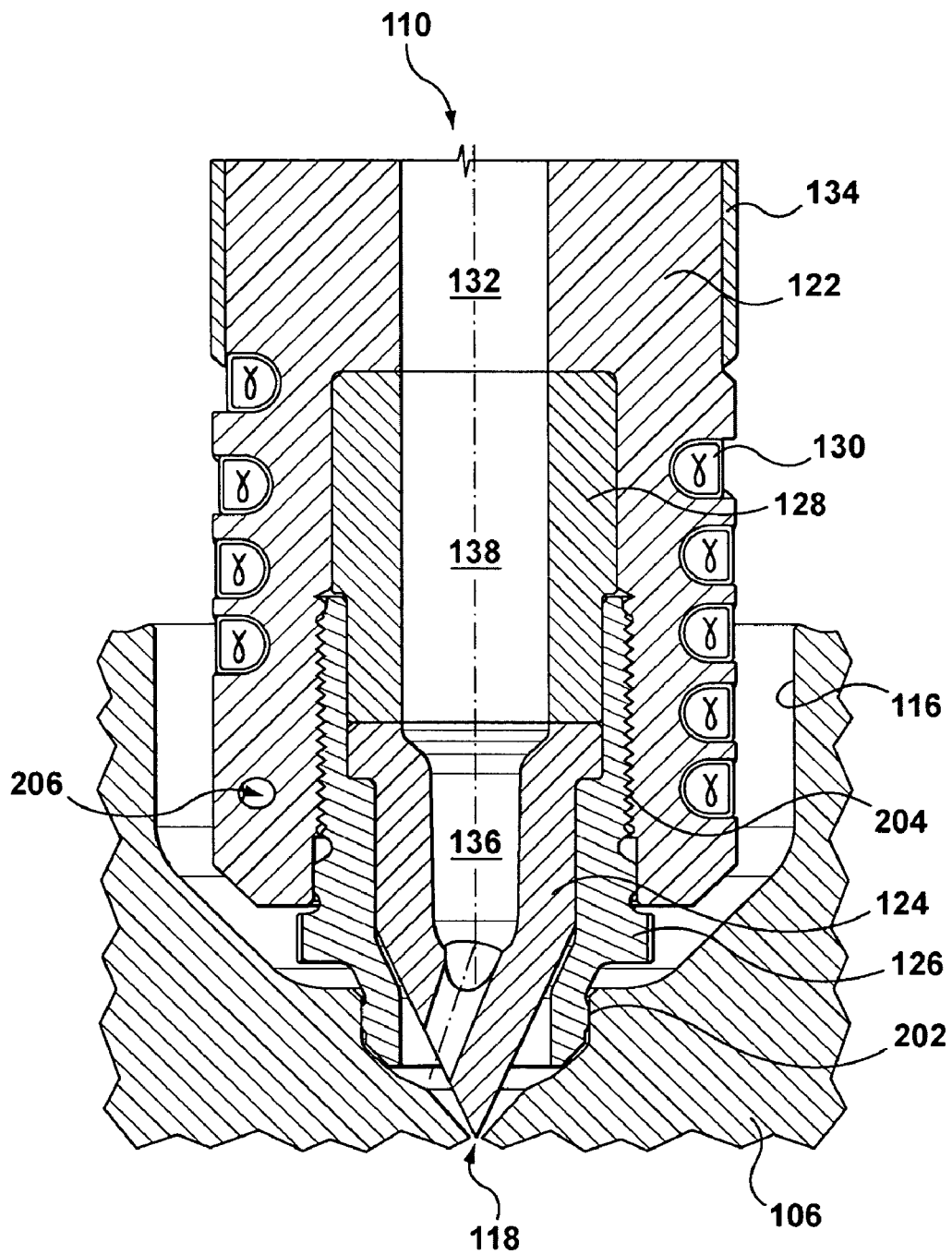
FIG. 2 is a sectional view of the downstream portion of the nozzle of FIG. 1.

FIG. 2 illustrates a sectional view of the downstream portion of the nozzle 110 of FIG. 1, in which further detail of the nozzle 110 can be seen. The seal piece 126 includes a sealing surface 202 that contacts an inside surface of the well 116 in the mold plate 106. Shown at 204 is the threaded connection of the seal piece 126 and the nozzle body 122. In addition, a thermocouple bore 206 for the thermocouple 133 is provided in the nozzle body 122.

As can be seen in FIG. 2, heat from the heater 130 will tend to flow from the embedded wires, through the nozzle body 122, thermal insert 128, seal piece 126, and nozzle tip 124, and into the molding material located in the nozzle body melt channel 132, insert melt channel 138, and tip melt channel 136. Heat will also tend to flow from the seal piece 126 into the relatively cool mold plate 106.

The thermal insert 128 is located between the heater 130 and the nozzle tip 124. Because of this, there is no path of heat flow from the nozzle body 122 to the nozzle tip 124 that does not cross the thermal insert 128 or the seal piece 126. In this way, the thermal insert 128 assists in thermally separating the nozzle tip 124 from the nozzle body 122. Another way of considering this thermal separation of the nozzle tip 124 is noting that the nozzle tip 124 does not contact the nozzle body 122.

The seal piece 126 can be made of a material such as tool steel (e.g., H13).

Tool steel is relatively insulative and so can reduce heat loss to the mold plate 106. The nozzle body 122 can also be made of tool steel. Other common materials for the seal piece 126 include titanium and ceramic. The nozzle tip 124 is generally made of a material having high wear resistance, such as tungsten carbide, to guard against wear by the flowing molding material. Other common tip materials include molybdenum alloys (e.g., TZM) and copper alloys (e.g., beryllium copper). The above materials for the seal piece 126 and the nozzle tip 124 are merely examples and should not be taken as limiting.

The interplay of the heat generated by the heater 130 and the materials of the nozzle body 122, seal piece 126, and nozzle tip 124, as well as the heat generated by the molding material when passing through the mold gate 118 establishes a thermal state of the downstream end of the nozzle 11 0. Because the molding material is injected in discrete shots and because the heater 130 may operate in an incidental manner (switching between on and off), the thermal state of the downstream end of the nozzle 110 can change over time (i.e., non-steady state).

The position of the thermal insert 128 means that the material of the thermal insert 128 can be selected to adjust the thermal state of the downstream end of the nozzle 110.

Consider an example where the thermal insert 128 is tungsten carbide. If stringing occurs at the mold gate 118, the tungsten carbide thermal insert 128 can easily be replaced by a titanium thermal insert 128. Because titanium is less thermally conductive than tungsten carbide, the thermal insert will act as an insulative barrier, such that the amount of heat flowing from the nozzle body 122 into the nozzle tip 124 via the thermal insert 128 will be reduced. This will reduce the temperature at the mold gate 118 and eliminate stringing or make it negligible. Tungsten carbide and titanium are simply examples of materials for the thermal insert 128 for the above example. Generally, problems resulting from too much heat at the mold gate 118 can be reduced by selecting a material for the thermal insert 128 having a thermal conductivity that is less than the thermal conductivity of the material of the nozzle tip 124 (i.e., selecting an insulative thermal insert).

Consider another example, in which the thermal insert 128 is tungsten carbide. If incomplete molded products are produced in a mold cavity 120, problematic freezing in the mold gate 118 might be occurring. The tungsten carbide thermal insert 128 can easily be replaced by a copper alloy thermal insert 128. Because copper alloy is more thermally conductive than tungsten carbide, the thermal insert will act as a better heat path, such that the amount of heat flowing from the nozzle body 122 into the nozzle tip 124 via the thermal insert 128 will be increased. This will increase the temperature at the mold gate 118, allowing for complete filling of the mold cavity 120. Tungsten carbide and copper alloy are simply examples of materials for the thermal insert 128 for the above example. Generally, problems resulting from insufficient heat at the mold gate 118 can be reduced by selecting a material for the thermal insert 128 having a thermal conductivity that is greater than the thermal conductivity of the material of the nozzle tip 124 (i.e., selecting a conductive thermal insert).

To summarize the above examples, the thermal insert 128 is made of a material that is different from the material of the nozzle tip 124 to help solve heat-related problems at the downstream end of the nozzle 110. The thermal insert 128 can be made of any material adaptable to injection molding, such as metal, ceramic, high-temperature polymer (e.g., PEEK or polyimide), and composites of these. In many cases, the ideal material for the thermal insert 128 will not be readily apparent, so trial and error can be used. An operator can try thermal inserts of various materials until the effects of the problem are minimized or eliminated. Of course, in the above examples, changes can be made to other factors, such as the set temperature of the heater 130 or the material of the seal piece 126. However, these changes may not be practical or adequate to solve the problem at hand. Thus, the ability to change the thermal insert for another thermal insert of a different material offers a simple way of solving heat-related problems.

Problems in a hot runner system, such as the system 100, can also vary from nozzle to nozzle. Therefore, thermal insert material can be independently selected for each nozzle. For example, in FIG. 1, the thermal insert 128 of the leftmost nozzle may be made of titanium, while the thermal insert 128 of the rightmost nozzle may be chosen to be tool steel. This kind of flexibility means that a problem in a specific nozzle can be rectified without affecting the operation of the other nozzles.

Figure 3:
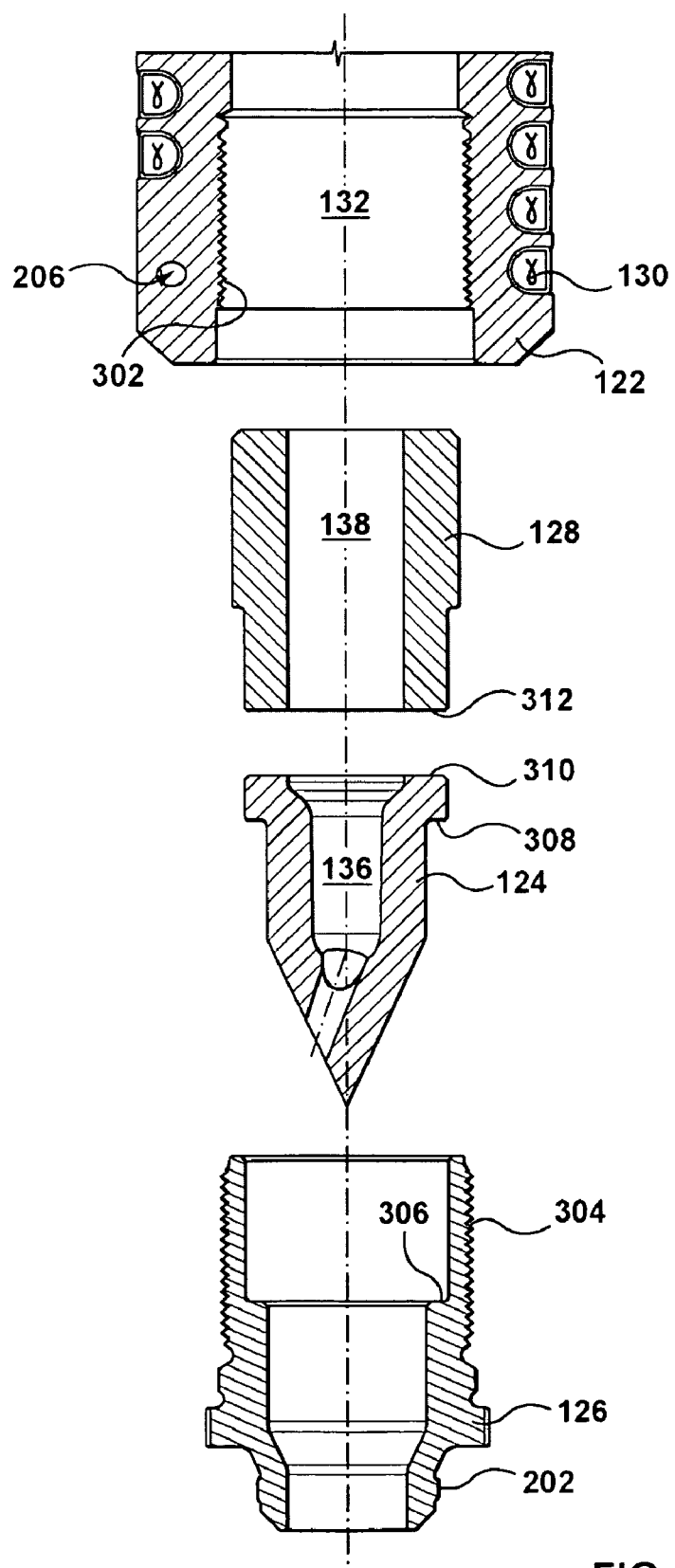
FIG. 3 is an exploded sectional view of the downstream portion of the nozzle of FIG. 2.

The ease of changing thermal inserts can be seen in FIG. 3, which illustrates an exploded sectional view of the downstream portion of the nozzle 110 shown in FIG. 2. The seal piece 126 is simply unscrewed from the nozzle body 122 so that the nozzle tip 124 and the thermal insert 128 slide out of the nozzle body 122. Barring any complications from solidified molding material, the thermal insert 128 can be changed quite easily.

Also shown in FIG. 3, are the thread 302 of the nozzle body 122 and the thread 304 of the seal piece 126, which can be mated to form the threaded connection 204. FIG. 3 further shows the surfaces that allow the seal piece 126 to hold the thermal insert 128 and the nozzle tip 124 in the nozzle body 122.

Specifically, a retaining surface 306 of the seal piece 126 abuts a surface 308 of the nozzle tip 124, and another surface 310 of the nozzle tip 124 abuts a surface 312 of the thermal insert 128, which abuts a surface (shown in FIG. 2) inside the nozzle body 122, such that the seal piece 126 holds the nozzle tip 124 and the thermal insert 128 to the nozzle body 122.

Figure 4:
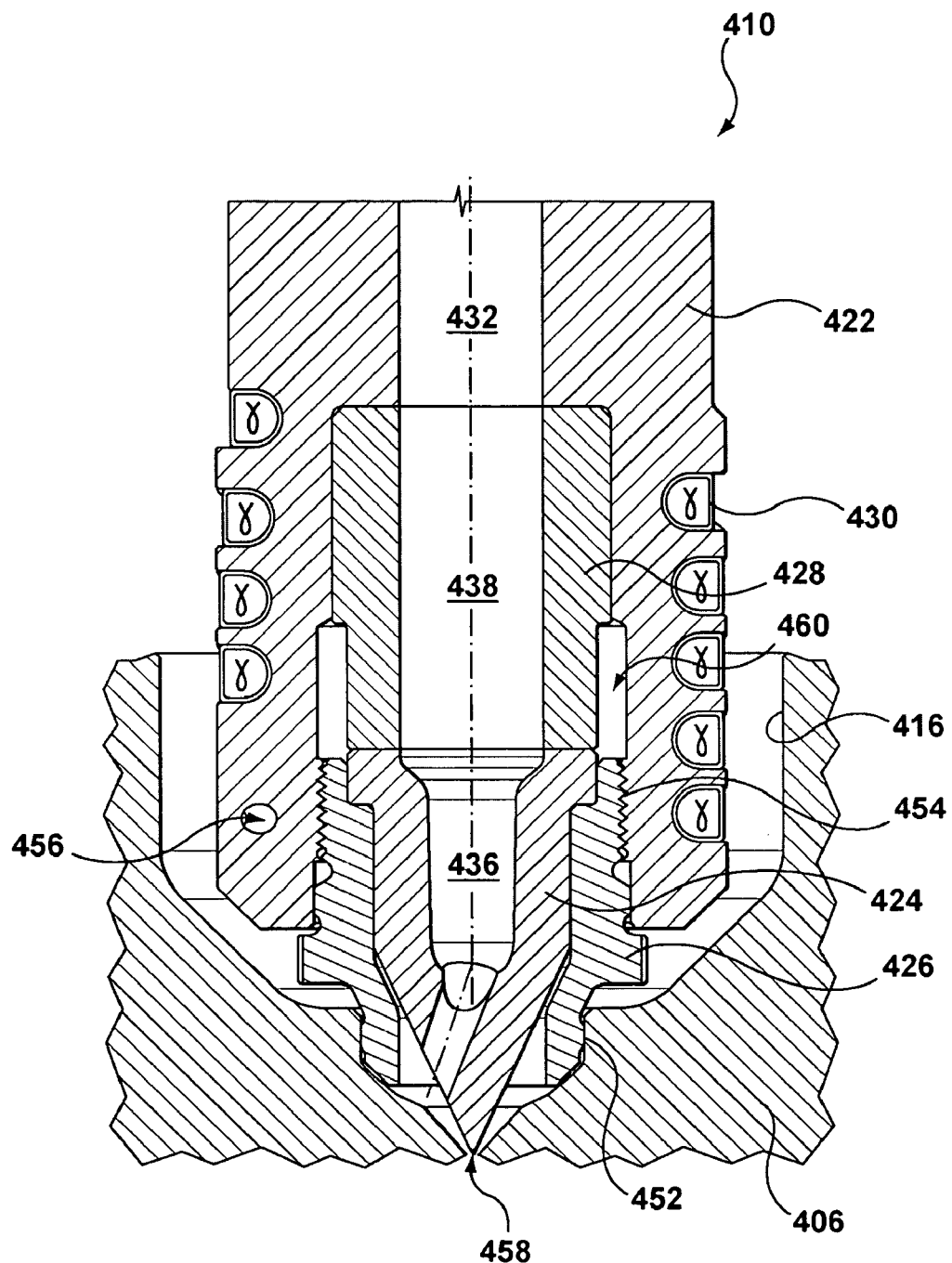
FIG. 4 is a sectional view of the downstream portion of a nozzle according to another embodiment of the present invention.

FIG. 4 illustrates a sectional view of the downstream portion of a nozzle 410 according to another embodiment of the present invention. In the description of this embodiment, like reference numerals in the 400 series are used to describe like parts for ease of understanding. The features and aspects described for the other embodiments can be used accordingly with the present embodiment.

The nozzle 410 includes a nozzle body 422, a nozzle tip 424, a seal piece 426, and a thermal insert 428. The nozzle body 422 has a spirally wrapped heater 430 embedded therein. The heater 430 can be any known type of heater, such as an electrical resistance heater wire, and need not be spirally wrapped or embedded. The nozzle body 422 has a nozzle body melt channel 432, which runs through the nozzle body 422 and communicates with a manifold melt channel. A thermocouple bore 456 is also provided in the nozzle body 422 to receive a thermocouple (not shown).

The nozzle tip 424 is disposed at the downstream end of the nozzle 410. The nozzle tip 424 includes a tip melt channel 436 that delivers molding material to a mold gate 458. In this embodiment the nozzle tip 424 is a torpedo tip, however, in other embodiments other types of tips can equally be used.

The seal piece 426 is removably connected to the downstream end of the nozzle body 422. In this embodiment, the connection is by way of a threaded connection 454. Other types of connections can instead be used, provided that the seal piece 426 is removably connected to the nozzle body 422. The seal piece 426 seals to a mold part 406 (e.g., mold plate or gate insert), preventing molding material from flowing into a well 416. Sealing is effected by a sealing surface 452 that contacts an inside surface of the well 416 in the mold part 406. In this embodiment, the seal piece 426 holds both the nozzle tip 424 and the thermal insert 428 to the nozzle body 422.

The thermal insert 428 is disposed upstream of the nozzle tip 424. The thermal insert 428 is in contact with and separable from the nozzle tip 424, and is also in contact with and separable from the nozzle body 422. That is to say, the thermal insert 428 is loosely inserted into the front of the nozzle body 422 (though the thermal insert 428 may not be loose when the nozzle 410 is hot). The thermal insert 428 has an insert melt channel 438 that communicates with the nozzle body melt channel 432 and the tip melt channel 436, such that the nozzle body melt channel 432, the tip melt channel 436, and the insert melt channel 438 are in mutual communication allowing flow of molding material. The material of the thermal insert 428 is selected to adjust to the thermal state of the downstream end of the nozzle 410, as previously discussed in detail with respect to the embodiment of FIGS. 1 and 2.

A gap 460 exists between the nozzle body 422, the thermal insert 428, the nozzle tip 424, and the seal piece 426. The gap 460 separates the nozzle tip 424 from the nozzle body 422, and acts as a thermal barrier. The gap 460 can contain air or molding material, both of which are relatively insulative. Heat flow is greatly reduced through the gap 460, and so heat must flow through the thermal insert 428 or the seal piece 426. There is no path of heat flow from the nozzle body 422 to the nozzle tip 424 that does not cross the thermal insert 428, the seal piece 426, or the insulative gap 460. In this way, the thermal insert 428 and the gap 460 assist in thermally separating the nozzle tip 424 from the nozzle body 422. Another way of considering this thermal separation of the nozzle tip 424 is noting that the nozzle tip 424 does not contact the nozzle body 422.

Figure 5:
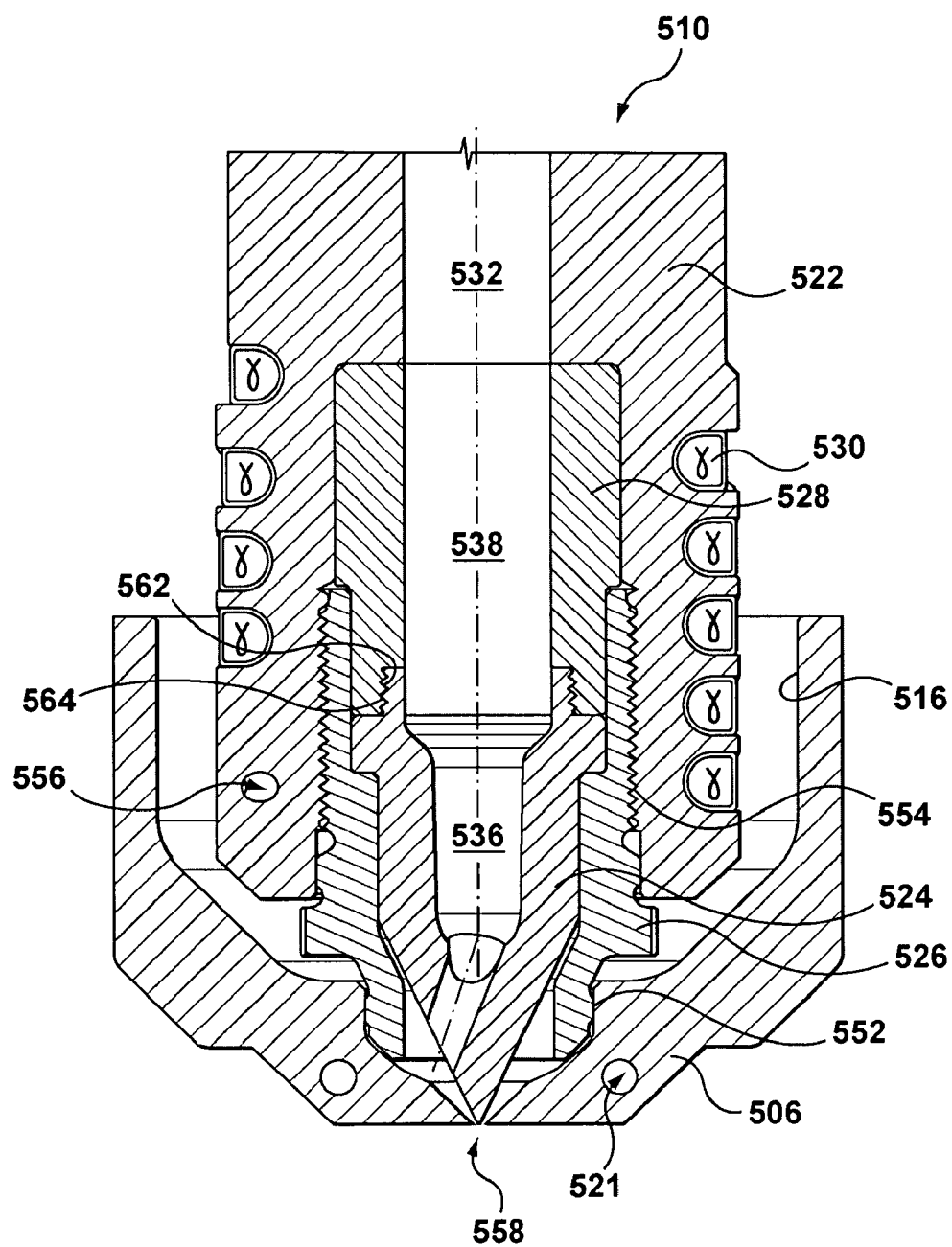
FIG. 5 is a sectional view of the downstream portion of a nozzle according to another embodiment of the present invention.

FIG. 5 illustrates a sectional view of the downstream portion of a nozzle 510 according to another embodiment of the present invention. In the description of this embodiment, like reference numerals in the 500 series are used to describe like parts for ease of understanding. The features and aspects described for the other embodiments can be used accordingly with the present embodiment.

The nozzle 510 includes a nozzle body 522, a nozzle tip 524, a seal piece 526, and a thermal insert 528. The nozzle body 522 has a spirally wrapped heater 530 embedded therein. The heater 530 can be any known type of heater, such as an electrical resistance heater wire, and need not be spirally wrapped or embedded. The nozzle body 522 has a nozzle body melt channel 532, which runs through the nozzle body 522 and communicates with a manifold melt channel. A thermocouple bore 556 is also provided in the nozzle body 522 to receive a thermocouple (not shown).

In this embodiment, the downstream end of the nozzle 510 is disposed in a gate insert 506. The gate insert 506 partially defines a well 516 to receive the nozzle 510. The gate insert includes a mold gate 558 and a cooling fluid conduit 521.

The nozzle tip 524 is disposed at the downstream end of the nozzle 510. The nozzle tip 524 includes a tip melt channel 536 that delivers molding material to the mold gate 558. The nozzle tip 524 further includes a thread 562 for removably connecting to the thermal insert 528. In this embodiment the nozzle tip 524 is a torpedo tip, however, in other embodiments other types of tips can equally be used.

The seal piece 526 is removably connected to the downstream end of the nozzle body 522. In this embodiment, the connection is by way of a threaded connection 554. Other types of connections can instead be used, provided that the seal piece 526 is removably connected to the nozzle body 522. The seal piece 526 seals to the gate insert 506, preventing molding material from flowing into the well 516. Sealing is effected by a sealing surface 552 that contacts an inside surface of the well 516 in the gate insert 506. In this embodiment, the seal piece 526 holds both the nozzle tip 524 and the thermal insert 528 to the nozzle body 522. In another embodiment, the seal piece 526 can extend down to the mold cavity and have a mold gate therein. In such an embodiment, the gate insert 506 would have a large central opening in place of the mold gate 558.

The thermal insert 528 is disposed upstream of the nozzle tip 524. The thermal insert 528 has a thread 564 for mating with the thread 562 of the nozzle tip 524 and is thus removably connected to the nozzle tip 524. The thermal insert 528 is in contact with and separable from the nozzle body 522. That is to say, after the thermal insert 528 and the nozzle tip 524 are threaded together, they can be loosely inserted into the front of the nozzle body 522 as one piece (though this fit may not be loose when the nozzle 510 is hot). The thermal insert 528 has an insert melt channel 538 that communicates with the nozzle body melt channel 532 and the tip melt channel 536, such that the nozzle body melt channel 532, the tip melt channel 536, and the insert melt channel 538 are in mutual communication allowing flow of molding material. The material of the thermal insert 528 is selected to adjust to the thermal state of the downstream end of the nozzle 510, as previously discussed in detail with respect to the embodiment of FIGS. 1 and 2.

Figure 6:
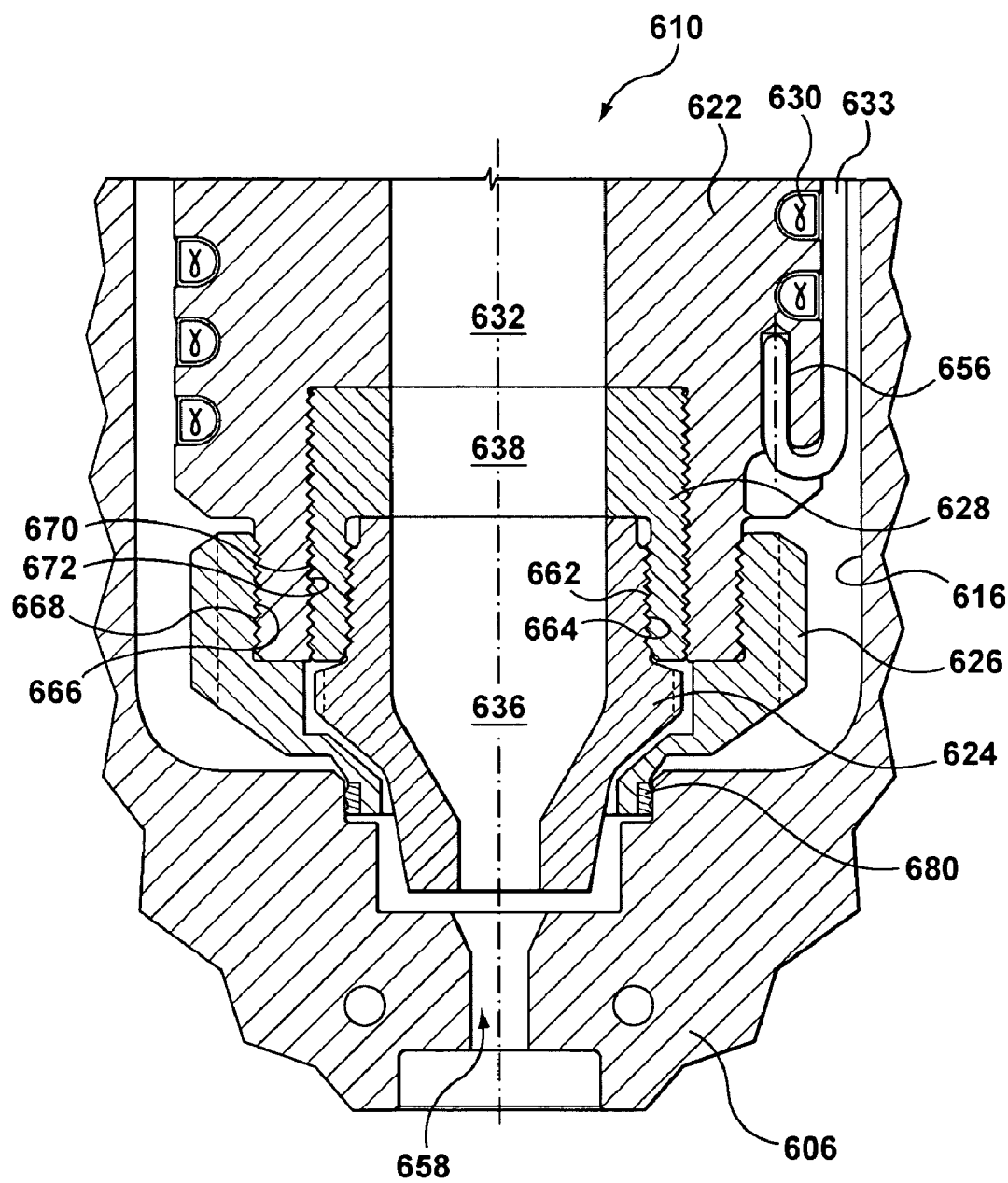
FIG. 6 is a sectional view of the downstream portion of a nozzle according to another embodiment of the present invention.

FIG. 6 illustrates a sectional view of the downstream portion of a nozzle 610 according to another embodiment of the present invention. In the description of this embodiment, like reference numerals in the 600 series are used to describe like parts for ease of understanding. The features and aspects described for the other embodiments can be used accordingly with the present embodiment.

The nozzle 610 includes a nozzle body 622, a nozzle tip 624, a seal piece 626, and a thermal insert 628. The nozzle body 622 has a spirally wrapped heater 630 embedded therein. The heater 630 can be any known type of heater, such as an electrical resistance heater wire, and need not be spirally wrapped or embedded. The nozzle body 622 has a nozzle body melt channel 632, which runs through the nozzle body 622 and communicates with a manifold melt channel. A thermocouple bore 656 is also provided in the nozzle body 622 to receive a thermocouple 633. The nozzle body 622 has an external thread 666 for removably connecting the seal piece 626, and has an internal thread 670 for removably connecting the thermal insert 628.

The nozzle tip 624 is disposed at the downstream end of the nozzle 610. The nozzle tip 624 includes a tip melt channel 636 that delivers molding material to a mold gate 658. The nozzle tip 624 has a thread 662 for removably connecting to the thermal insert 628.

The seal piece 626 has a thread 668 for mating with the thread 666 of the nozzle body 622, such that the seal piece 626 is removably connected to the downstream end of the nozzle body 622. Other types of connections can instead be used, provided that the seal piece 626 is removably connected to the nozzle body 622. The seal piece 626 includes a separate seal 680 that seals to an inside surface of a well 616 of a mold part 606 (e.g., mold plate or gate insert), preventing molding material from flowing into the well 616. In other embodiments, the seal piece 626 and seal 680 can be integral. In this embodiment, the seal piece 626 does not hold either the nozzle tip 624 or the thermal insert 628 to the nozzle body 622.

The thermal insert 628 is disposed upstream of the nozzle tip 624. The thermal insert 628 has a thread 664 for mating with the thread 662 of nozzle tip 624, and has another thread 672 for mating with the thread 670 of the nozzle body 622. In this way, the thermal insert 628 is removably connected to the nozzle tip 624 and the nozzle body 622. The thermal insert 628 has an insert melt channel 638 that communicates with the nozzle body melt channel 632 and the tip melt channel 636, such that the nozzle body melt channel 632, the tip melt channel 636, and the insert melt channel 638 are in mutual communication allowing flow of molding material. The material of the thermal insert 628 is selected to adjust to the thermal state of the downstream end of the nozzle 610, as previously discussed in detail with respect to the embodiment of FIGS. 1 and 2.

In this embodiment, the separate sets of threads 670, 672 and 666, 668 allow for the nozzle tip 624 and thermal insert 628 to be connected to the nozzle body 622 independently of the seal piece 626. This arrangement means that the nozzle tip 624 does not need to contact the seal piece 626, and thus the nozzle tip 624 is thermally connected to the nozzle body 622 by only the thermal insert 628. The result is that the material of the thermal insert 628 may play a larger role in controlling the temperature of the nozzle tip 624.

The set of threads 662, 664 allow for the nozzle tip 624 to be removably connected to the thermal insert 628, so that these parts can be connected to the nozzle body 622 as one piece. The thermal insert 628 can be provided with a tool surface or aperture to facilitate its removal from the nozzle body 622 should it remain in the nozzle body 622 when the nozzle tip 624 is removed.

Figure 7:
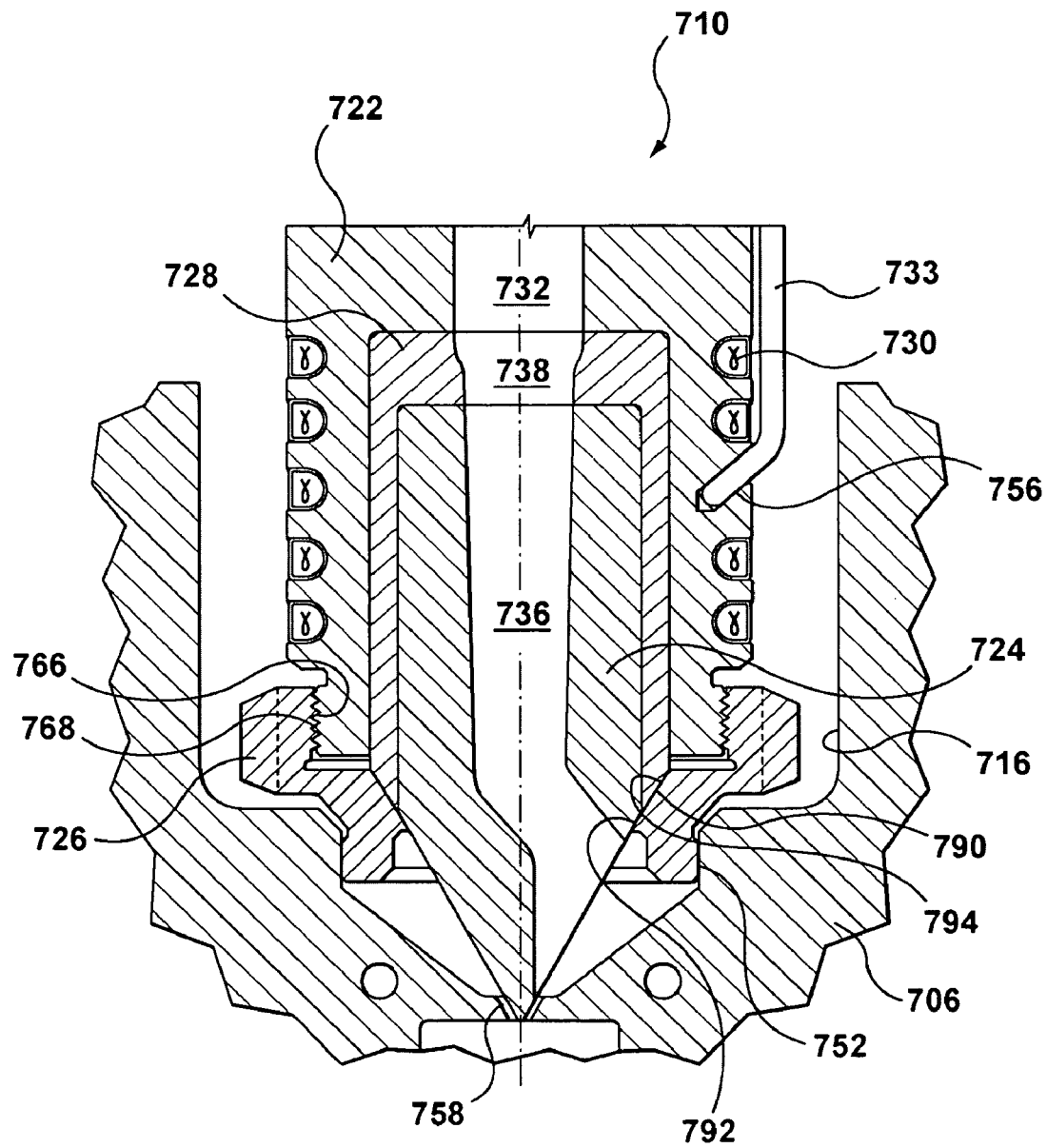
FIG. 7 is a sectional view of the downstream portion of a nozzle according to another embodiment of the present invention.

FIG. 7 illustrates a sectional view of the downstream portion of a nozzle 710 according to another embodiment of the present invention. In the description of this embodiment, like reference numerals in the 700 series are used to describe like parts for ease of understanding. The features and aspects described for the other embodiments can be used accordingly with the present embodiment.

The nozzle 710 includes a nozzle body 722, a nozzle tip 724, a seal piece 726, and a thermal insert 728. The nozzle body 722 has a spirally wrapped heater 730 embedded therein. The heater 730 can be any known type of heater, such as an electrical resistance heater wire, and need not be spirally wrapped or embedded. The nozzle body 722 has a nozzle body melt channel 732, which runs through the nozzle body 722 and communicates with a manifold melt channel. A thermocouple bore 756 is also provided in the nozzle body 722 to receive a thermocouple 733. The nozzle body 722 has an external thread 766 for removably connecting the seal piece 726.

The nozzle tip 724 is disposed at the downstream end of the nozzle 710.

The nozzle tip 724 includes a tip melt channel 736 that delivers molding material to a mold gate 758. The nozzle tip 724 also includes a surface 792 for contact to the seal piece 726. In this embodiment the nozzle tip 724 is a torpedo tip, however, in other embodiments other types of tips can equally be used.

The seal piece 726 has a thread 768 for mating with the thread 766 of the nozzle body 722, such that the seal piece 726 is removably connected to the downstream end of the nozzle body 722. Other types of connections can instead be used, provided that the seal piece 726 is removably connected to the nozzle body 722. The seal piece 726 seals to a mold part 706 (e.g., mold plate or gate insert), preventing molding material from flowing into a well 716. Sealing is effected by a sealing surface 752 that contacts an inside surface of the well 716 in the mold part 706. In this embodiment, the seal piece 726 has as retaining surface 790 that contacts and holds to the nozzle body 722 both the nozzle tip 724, via abutment to the surface 792, and the thermal insert 728.

The thermal insert 728 is disposed upstream of the nozzle tip 724. The thermal insert 728 is in contact with and separable from the nozzle tip 724, and is also in contact with and separable from the nozzle body 722. That is to say, the thermal insert 728 is loosely inserted into the front of the nozzle body 722, and loosely receives the nozzle tip 724 therein (though these fits may not be loose when the nozzle 710 is hot). The thermal insert 728 includes a surface 794 that abuts the retaining surface 790 of the seal piece 726. The thermal insert 728 has an insert melt channel 738 that communicates with the nozzle body melt channel 732 and the tip melt channel 736, such that the nozzle body melt channel 732, the tip melt channel 736, and the insert melt channel 738 are in mutual communication allowing flow of molding material. The material of the thermal insert 728 is selected to adjust to the thermal state of the downstream end of the nozzle 710, as previously discussed in detail with respect to the embodiment of FIGS. 1 and 2.

The shape of the thermal insert and how it "walls in" the nozzle tip 724 means that the nozzle tip 724 does not contact a large portion of the seal piece 726, and thus the nozzle tip 724 is thermally connected to the nozzle body 722 largely only by the thermal insert 728. The result is that the material of the thermal insert 728 may play a larger role in controlling the temperature of the nozzle tip 724.

In the embodiments of FIGS. 1-5 and 7, the seal piece may also be called a tip retainer.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

What is claimed is:

1. A thermally gated hot runner nozzle, comprising:
a nozzle body having a nozzle body melt channel;
a heater connected to the nozzle body;
a seal piece connected to the nozzle body for sealing to a mold part;
a nozzle tip having a tip melt channel; and
a thermal insert having an insert melt channel, the thermal insert being in contact with and separable from the nozzle tip and the thermal insert being in contact with and separable from the nozzle body, wherein the nozzle body melt channel, the tip melt channel, and the insert melt channel are in mutual communication, and wherein the thermal insert is of a material having a thermal conductivity different from the thermal conductivity of the material of the nozzle tip.

2. The thermally gated hot runner nozzle of claim 1, wherein the thermal conductivity of the material of the thermal insert is greater than the thermal conductivity of the material of the nozzle tip.

3. The thermally gated hot runner nozzle of claim 1, wherein the thermal conductivity of the material of the thermal insert is less than the thermal conductivity of the material of the nozzle tip.

4. The thermally gated hot runner nozzle of claim 1, wherein a gap exists between the nozzle body and at least one of the thermal insert, the nozzle tip, and the seal piece.

5. The thermally gated hot runner nozzle of claim 1, wherein the thermal insert has a thread mated with a thread of the nozzle tip.

6. The thermally gated hot runner nozzle of claim 1, wherein the thermal insert has a thread mated with a thread of the nozzle body.

7. The thermally gated hot runner nozzle of claim 1, wherein the thermal insert contacts the seal piece.

8. The thermally gated hot runner nozzle of claim 1, wherein the seal piece holds the thermal insert to the nozzle body.

9. The thermally gated hot runner nozzle of claim 1, wherein the seal piece holds the nozzle tip to the nozzle body.

10. The thermally gated hot runner nozzle of claim 1, wherein the seal piece is connected to the nozzle body by a threaded connection and the seal piece holds the thermal insert and the nozzle tip to the nozzle body.

11. The thermally gated hot runner nozzle of claim 10, wherein the thermal insert contacts the seal piece.

12. The thermally gated hot runner nozzle of claim 11, wherein the thermal insert has a thread mated with a thread of the nozzle tip.

13. The thermally gated hot runner nozzle of claim 1, wherein the seal piece is connected to the nozzle body by a threaded connection, the thermal insert has a thread mated with a thread of the nozzle tip, and the thermal insert has another thread mated with a thread of the nozzle body.

14. A thermally gated hot runner system, comprising:
a manifold having a manifold melt channel;
two or more nozzles, each nozzle having:
a nozzle body having a nozzle body melt channel in communication with the manifold melt channel;
a heater connected to the nozzle body;
a seal piece connected to the nozzle body for sealing to a mold part;
a nozzle tip connected to the nozzle body; and
a thermal insert having an insert melt channel, the thermal insert being in contact with and separable from the nozzle tip and the thermal insert being in contact with and separable from the nozzle body,
wherein the thermal insert of one of the nozzles has a thermal conductivity different from the thermal conductivity of the thermal insert of another of the nozzles.

15. The thermally gated hot runner system of claim 14, wherein the thermal conductivity of one of the thermal inserts is greater than the thermal conductivity of the respective nozzle tip.

16. The thermally gated hot runner system of claim 14, wherein the thermal conductivity of one of the thermal inserts is less than the thermal conductivity of the respective nozzle tip.

17. The thermally gated hot runner system of claim 14, wherein one of the thermal inserts has a thread mated with a thread of the respective nozzle tip.

18. The thermally gated hot runner system of claim 14, wherein one of the thermal inserts has a thread mated with a thread of the respective nozzle body.

* * * * *